United States Patent
Carlson et al.

(10) Patent No.: US 6,256,706 B1
(45) Date of Patent: Jul. 3, 2001

(54) STORAGE AND ACCESS TO SCRATCH MOUNTS IN VTS SYSTEM

(75) Inventors: Wayne Charles Carlson; Jonathan Wayne Peake, both of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/641,924

(22) Filed: Aug. 17, 2000

Related U.S. Application Data

(62) Division of application No. 08/919,043, filed on Aug. 27, 1997, now Pat. No. 6,173,359.

(51) Int. Cl.⁷ .................................................. G06F 12/02
(52) U.S. Cl. ............................................................ 711/112
(58) Field of Search ............................................ 711/112

(56) References Cited

U.S. PATENT DOCUMENTS

| | | | |
|---|---|---|---|
| 5,157,770 | 10/1992 | Beardsley | 711/112 |
| 5,193,184 | 3/1993 | Belsan et al. | 711/4 |
| 5,327,535 | 7/1994 | Ogata et al. | 711/113 |
| 5,408,630 | 4/1995 | Moss | 711/112 |
| 5,438,674 | 8/1995 | Keele et al. | 711/4 |
| 5,455,926 | 10/1995 | Keele et al. | 711/4 |
| 5,485,321 | 1/1996 | Leonhardt et al. | 360/48 |
| 5,546,557 | 8/1996 | Allen et al. | 711/111 |
| 5,603,003 | 2/1997 | Akizawa et al. | 711/114 |
| 5,617,566 | 4/1997 | Malcolm | 707/284 |

OTHER PUBLICATIONS

Technical Disclosure Bulletin entitled "Fast Format via Swap with a Pre–formatted Scratch Cartridge", vol. 37, No. 01, dated Jan., 1994.

*Primary Examiner*—Reginald G. Bragdon
(74) *Attorney, Agent, or Firm*—Dan Hubert & Assoc.

(57) ABSTRACT

A portion of digital data records are stored on a direct access storage device (DASD) in emulation of sequential-access media when the parent digital data records are transferred to a sequential-access media. The efficiency of storage and access to the data portion is improved by random-access recall of the data in the data portion, and by constructing a data portion trailer containing various statistics about the records for referencing the digital data and advancing to target data. The volume data portion trailer is constructed as read forward and forward space block operations are performed. Data is preferably stored in logically assembled records. Interspersed with the records, there may be one or more marker codes, which function like tape marks among the various data records. The volume trailer may contain pointers to each record, a record count and marker codes for the data portion. Statistics contained in the data portion trailer enable substantially more efficient access of the data by a DASD.

6 Claims, 8 Drawing Sheets

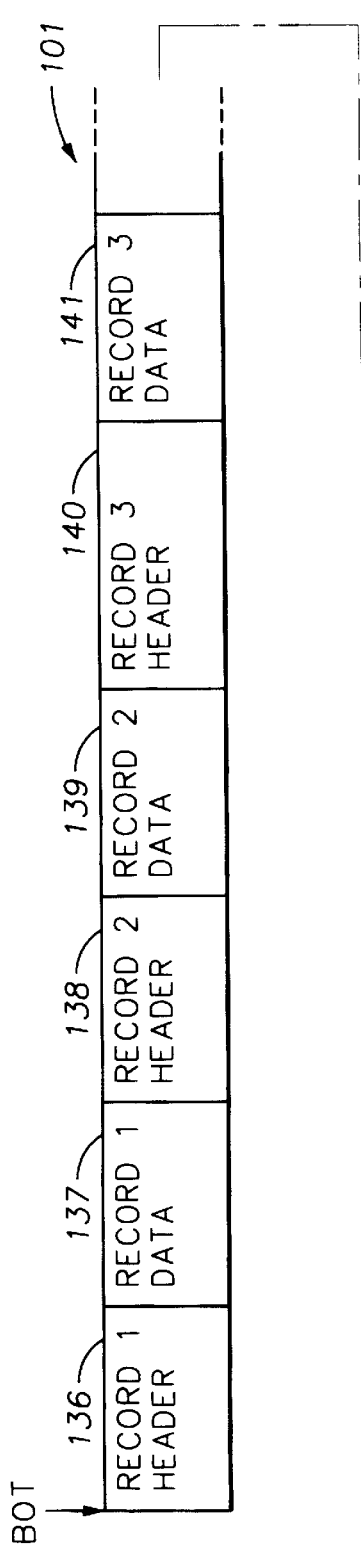
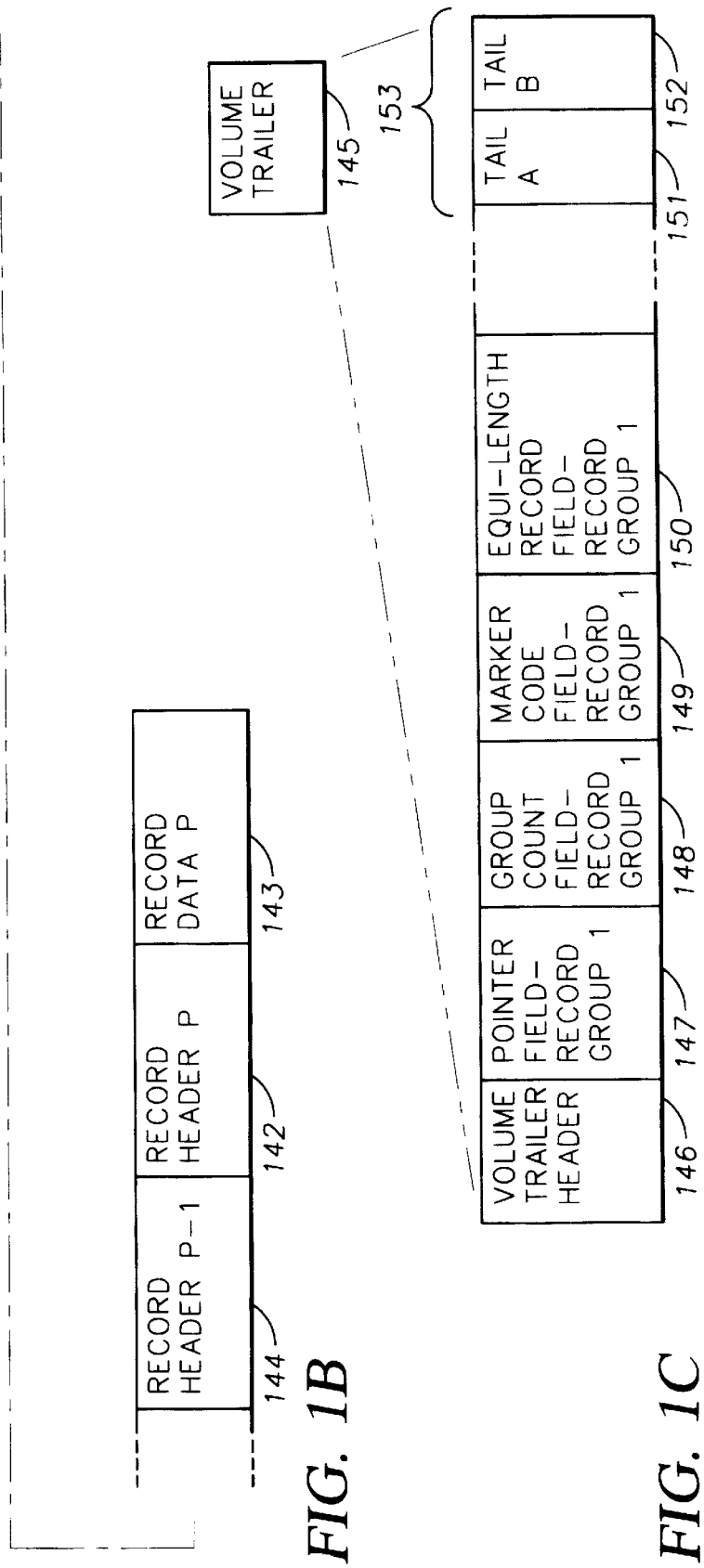
*FIG. 1B*
*FIG. 1C*

STORAGE AND ACCESS TO SCRATCH MOUNTS IN VTS SYSTEM

CROSS-REFERENCE TO RELATED APPLICATIONS

The present application is a divisional of U.S. patent application Ser. No. 08/919,043, filed on Aug. 27, 1997 in the names of the present inventors, now U.S. Pat. No. 6,173,359.

BACKGROUND OF THE INVENTION

1. Field of the Invention

The present invention generally relates to quickly accessing a portion of data stored on a sequentially accessible storage device. More particularly, the invention concerns a method and apparatus which retains on a direct-access storage device (DASD) a portion of the digital data transferred to a sequential-access storage media, and facilitates fast access to that portion of digital data. The format of the portion of digital data retained in the DASD generally emulates the format of the sequential-access storage media.

2. Description of the Related Art

Over the years, engineers have developed many different ways of digitally storing data. Two of the most popular involve sequential-access storage drives (i.e., tape media), and DASD. As an example, DASD storage includes magnetic hard disk drives and magnetic floppy diskettes. Tape storage, for instance, includes electromagnetic or optical tapes, and may involve storage patterns such as linear, helical, and serpentine patterns.

DASD and tape storage offer contrasting benefits and limitations. Thus, users may choose DASD for some storage needs, and tape for others. As would be expected, DASD and tape storage have each evolved through the years with contrasting storage formats. This is due to the different physical characteristics of the respective media. In particular, DASD-stored data is randomly accessible, by simply moving a read/write head directly to a specific sector and track location where a desired data item exists. In contrast, tape-stored data is accessed sequentially, by rewinding or advancing the tape until reaching the desired data item.

In tape storage, data is typically stored in units called "records" or "blocks". Interspersed within the records are various headers, each of which contains information describing various characteristics of the associated data record. Adjacent header/record pairs may be separated by an inter-block gap (IBG), which is a unique hardware-recognizable pattern of stored data. The IBGs are particularly advantageous when attempting to locate a particular data record on the tape. First, the tape is advanced to a point on the tape where the data record likely begins, or to a point where a group of records including the data record begins. Then, the tape head advances or rewinds, record-by-record, until the desired record is reached. Such movement of the tape head is conducted using the IBGs as guideposts.

It is common practice for the first few records written on the tape to contain information about the tape volume and the data recorded on it. The collection of records containing the information is typically called the volume label. In the mainframe operating system type environment ("MVS"), the information contained in the volume label is used by a tape management system to determine who owns a tape volume and if the data contained on the volume has expired and can be overwritten by an application program. This means that prior to writing new data from the beginning of a tape volume, at least the first set of records containing the volume label must be read by the host operating system.

In addition to individual record or "block" headers, a tape usually includes a volume header near the beginning of tape (BOT) point. The volume header includes various statistics concerning all records contained on the tape. The volume header is necessarily placed at the tape's beginning because, when a tape cartridge is first loaded to a tape drive, access of the tape begins at the BOT point. To locate the volume header elsewhere would require time consuming forwarding of the tape to reach the volume header.

The foregoing description of tape storage significantly contrasts with DASD storage. Although most formats of DASD storage use headers of various types, DASD storage does not require IBGs. This is because the DASD read/write head, by virtue of its inherent random access capability, can proceed directly to the desired data, without having to sequence record-by-record to find a desired record.

With the advent of the virtual tape system (VTS), the line between DASD and tape storage has blurred. A VTS stores data on tape, taking advantage of this inexpensive means of long term data storage. However, to expedite data exchanges, data is cached in a DASD. According to a predetermined criteria, such as the data's age or recency/frequency of use, the data is backed up on tape. Cache misses may result in older data being retrieved from tape and stored again in the DASD cache.

To maintain a consistent data storage format in VTS, it is desirable to use one substantially common tape-like storage format for both DASD and tape media. When this tape-like storage format is applied to DASD, however, some of the normal mechanisms for locating data on tape are no longer useful. Chiefly, the data is not stored with IBGs, which are inapplicable to the direct-access storage format. Even with IBGs, however, access to DASD data would be severely retarded by requiring the DASD head to sequence record-by-record through the data, when direct access is possible. Thus, certain improvements to strict tape storage formats as stored on the DASD are needed as an improved process for accessing the data to take advantage of the inherently rapid data access potential of DASD storage.

Furthermore, improvements in the methods used to store and access data cached in a DASD used in a VTS are also desirable. Current methods, although faster than methods requiring a complete volume of data to be read from tape storage, need to be improved to allow faster access to at least portions of the data stored on tape.

As described previously, some operating systems depend on reading the first few data records on the tape prior to allowing new data to be written from the beginning of the tape. In prior art VTS systems, the older data for a volume must be retrieved from tape and stored again in the DASD cache, even though only the first few records are utilized. The present invention eliminates the need to retrieve the older data and allows for faster access to the data.

SUMMARY OF THE INVENTION

Broadly, the present invention concerns fast access to at least a portion of the data stored on a sequential-access storage device. When data is transferred to the sequential-access storage device, a portion of the data ("data portion") is retained in a DASD in emulation of the sequential-access media. In the preferred version of the invention, the data portion retained on DASD includes record headers and data records. In another embodiment, the data portion retained may employ a volume header to efficiently store and access the data on/from the DASD.

In another embodiment, the data portion may be stored in discrete records. Interspersed with the records, there may be one or more marker codes, which function like tape marks among the various data records. A data portion trailer containing pointers to each record, record counts, marker code counts, and indicators of whether records in the data portion are of equal length may be constructed and stored in a quick access addressable storage unit ("memory"). The data portion trailer may also include a data portion trailer "tail", including information such as a byte count for the entire data portion trailer, and a unique sequence identifying the data portion trailer. In the preferred embodiment, the data portion trailer is stored in volatile memory, such as random access memory ("RAM"), thereby allowing even faster access to the data portion.

The statistics contained in the data portion trailer enable even faster access to the data. For example, the data portion trailer of one embodiment of the invention may include information concerning record counts and/or marker code counts used to perform operations such as read forward, forward space block, backward space block and backward space file.

As an example, the read forward routine starts by receiving identification of a target data record. Then, the record header on the direct access device is referenced to identify a target record containing the target data. Depending upon the physical implementation of a cache, the read/write device is then positioned to read the next record header.

In one embodiment, the invention may be implemented to provide a method to quickly and efficiently store and/or access digital data constructed according to the invention. The data access may include a data portion trailer in one version. In another embodiment, the invention may be implemented to provide an apparatus to store and/or access digital data constructed according to the invention. In still another embodiment, the invention may be implemented to provide a programmed product comprising signal-bearing media tangibly embodying a program of machine-readable instructions executable by a digital data processing apparatus to perform method steps for storing and/or accessing digital data constructed according to the invention.

The invention affords its users with a number of distinct advantages. For example, the invention provides a fast and efficient means—as compared to standard VTS—for locating portions of a digital data record stored on a sequential-access storage device. This is because access to the data, if stored in the data portion retained on the DASD when the data is transferred to the sequential-access storage device, is by random access of digital data rather than sequential-access.

The invention also provides a number of other advantages and benefits, which will be more readily apparent from the following description of the invention.

BRIEF DESCRIPTION OF THE DRAWING

The nature, objects, and advantages of the invention will become more apparent to those skilled in the art after considering the following detailed description in connection with the accompanying drawings, in which like reference numerals designate like parts throughout, wherein:

FIG. 1B is a block diagram of a data portion storage format used in accordance with one version of the present invention;

FIG. 1C is a block diagram of a data portion trailer used in one embodiment of the present invention;

DETAILED DESCRIPTION OF THE PREFERRED EMBODIMENTS

Hardware Components & Interconnections

Data Storage Media

Broadly, the present invention concerns the use of a storage format and method allowing fast and efficient access to digital data stored on a DASD in emulation of sequential-access media. For ease of notation and not by way of limitation, sequential-access storage devices will be referred to generally as a tape device. Under this storage format, a portion of a logical volume transferred to a tape device is retained in a DASD and used to quickly access that portion of the logical volume. This format and method allows host operations that need only data included in the data portion to receive a fast response to a data request. A fast response is possible because the relevant data is stored in the DASD, and the tape storage device does not need to be read back from to retrieve the digital data.

This data storage format may be implemented in a number of different storage environments. Of particular advantage, however, is the implementation of this format to store data in a DASD, in emulation of the sequential-access storage media. Preferably, then, the foregoing data storage format is used to store data in one or more DASDs, such as hard drives, floppy diskettes, optical discs, electronic memory provided by integrated circuitry or the like. Nonetheless, the invention also contemplates use of this format for other storage media, including sequential-access media such as magnetic tape, optical tape, optical disk or similar media.

The details of one example of this storage format are set forth below.

Data Storage Format

Introduction

The data storage format of the invention logically arranges a portion of data from a data volume that is transferred to a tape, and is preferably implemented in DASD storage. The data volume may be transferred to tape to make room for other data which must be stored in the DASD, but a portion of the data transferred is retained in the DASD. For example, data that is used more frequently would remain in DASD while data used less frequently might be moved to tape storage. Also, large volumes of data which use up too much DASD capacity might be transferred to a tape device, and only a portion retained in the DASD.

By being stored in DASD, the data portion has certain advantages over the tape-stored volume. For instance, the data contained in the data portion can be quickly accessed, since it is randomly accessible, unlike the tape-stored data.

Even though randomly accessible, the data in each data portion is logically ordered in a sequence. This sequence may progress, for example, from a beginning address on DASD to an ending DASD address. The addresses need not be contiguous, however, and the addresses and the data sequence may be any arbitrarily desired relationship.

Figure 1A:
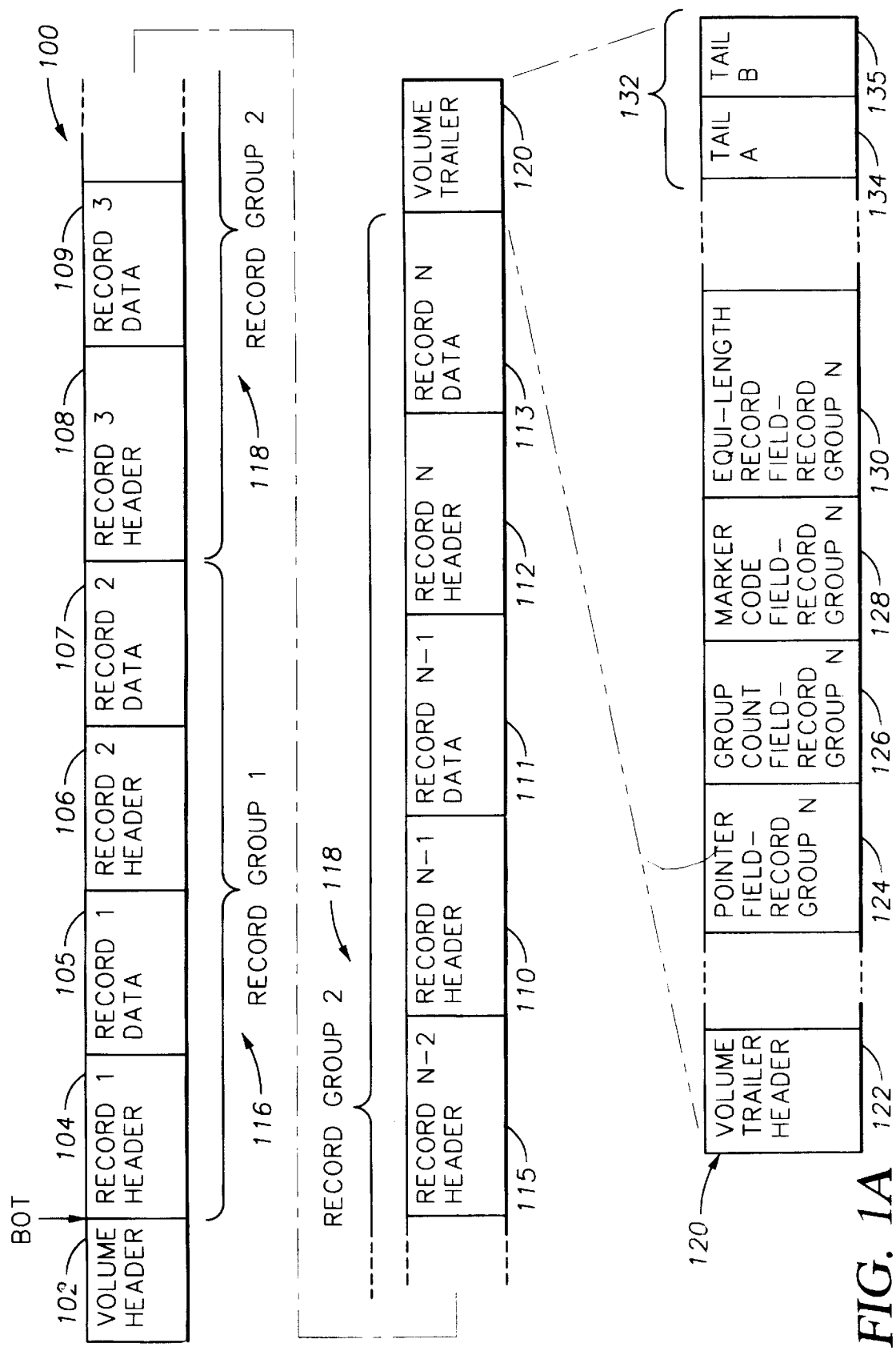
FIG. 1A is a block diagram illustrating a typical volume data storage format, including an exploded view of a typical volume trailer.

FIG. 1A depicts storage format for a volume 100 of data that is transferred to a tape device. FIG. 1B depicts an exemplary storage format for a data portion 101 that may be retained in the DASD when the volume 100 is transferred.

Volume Header

First in the data sequence of the volume 100, there is a volume header 102. The volume header 102 may include any desired information about data records of the volume. As an example, the volume header 102 may include some similar information as known volume headers employed by ordinarily skilled artisans in the tape storage arts. The volume header preferably includes information to identify the volume, data and time stamp information, specification of a format used to represent the data storage format used, and validity verification data such as logical redundancy check (LRC), cyclical redundancy check (CRC), check sum, etc. The volume header may, for example, have a fixed length, thereby establishing a consistent predetermined position for the first data record in the volume.

The preferred embodiment of the data portion 101, shown in FIG. 1B—the portion of volume 100 that remains in a DASD when volume 100 is transferred to the tape device—includes a volume header. However, a volume header is not required and may not be included in other embodiments of the data portion 101 as discussed below.

Data Records & Record Groups

Data in a volume occurs in the form of data records, such as the data records 105, 107, 109, 111, and 113. Each data record has a corresponding record header, which precedes the data record. As illustrated, data records 105, 107, 109, 111, and 113 are preceded by record headers 104, 106, 108, 110, and 112. The header 115 exists without a corresponding data record, for reasons explained below. The records are preferably numbered with consecutive integers, as shown in FIGS. 1A and 1B (e.g., record 1, record 2, etc.).

Data records are logically grouped into "record groups", each record group containing a number of data records that are logically adjacent to each other in the prescribed data sequence. In the illustrated example, a first record group 116 includes data records 105 and 107, as well as the corresponding headers 104 and 106. A second record group 118 includes data records 109, 111, 113, and the record headers 108, 115, 110, and 112. However, the concept of record groups does not apply to the data portion 101 shown in FIG. 1B. This is because the portion of data included in the data portion 101 is generally smaller than the size of a record group. For example, the portion of data included in the data portion 101 is approximately four thousand bytes. In other embodiments, the size of the portion of data 101 may be larger or smaller. The benefit of retaining more or less data in the DASD is determined by data volume requirements and performance criteria. If the data portion 101 is too large, the advantages realized by the present invention are reduced and storage overhead costs are increased. If the data portion 101 is too small, the portion of data quickly accessible is reduced and the usefulness of the invention diminishes accordingly.

In the representative example of FIG. 1B, the data portion 101, representing a portion of the data of volume 100, includes records 137, 139, 141 and 143, as well as the corresponding headers 136, 138, 140, and 142. Although four records and corresponding headers are illustrated, any number of records or headers may be included in the data portion 101, exemplified by record 143 representing a record P. and header 142 representing corresponding header P.

The data records may vary in size, depending upon the amount of data in that record. In some circumstances, however, it may be desirable to have all records equisized. Nonetheless, the data records and record headers are logically concatenated to each other within the data portion 101.

Each record header includes various information about the subsequent data record. In an illustrative embodiment, each record header is twelve bytes long, and includes the following components:

1. a four byte field listing the length of the corresponding data record;
2. a field listing an integer "record number" of the corresponding record, according to its order in the data sequence;
3. a field containing an ASCII "H", uniquely identifying the record header as such; and
4. a record type field, indicating whether the record header constitutes (1) a marker code, which has no corresponding data record, or (2) a record header having a corresponding data record; as an example, the record type field may comprise a binary code such as a designated bit.

If desired, record headers and data records may also include validity checking information such as LRC, CRC, checksum, etc.

Marker Codes

With sequential-access media, it is often useful to include "tape marks", which operate as selectively placed bookmarks to designate certain locations in the data. This saves time when sequentially advancing or rewinding through the media to find a certain spot. Known DASD storage formats have no use for "tape marks", because the data maintained by DASDs is randomly accessible.

Since the data storage format for a data portion 101 of the present invention emulates tape storage on directly accessible storage media, however, it is advantageous for the format shown in FIG. 1B to use tape marks. This is because, in a VTS environment, the DASD-stored data is actually used by a tape-compatible application program or host.

Thus, the invention satisfies the function of tape marks with "marker codes". Preferably, a marker code comprises a record header without any corresponding data record. An example is the marker code 144 shown in FIG. 1B. Lacking an associated data record, the marker code in the illustrated example may be eight bytes long, as the four byte field representing the length of data is unnecessary.

Thus, the data storage format of the invention includes a marker code to mark locations in DASD-stored data, analogous to a tape mark in sequential-access media. Unlike tape storage, however, the data storage format of the invention employs the marker codes more efficiently than possible with tape marks on sequential media, by advantageously invoking the random access capability of DASD storage. This is achieved using various statistics regarding marker codes, stored in a "data portion trailer" used in one embodiment of the invention as discussed immediately below.

Data Portion Trailer

According to the fast access data storage format of one embodiment of the invention, the logical sequence of each data portion retained in the direct access storage device may conclude with a data portion trailer containing various statistics about the logically preceding data portion.

A data portion trailer 145 employed in one version of the present invention is illustrated in FIG. 1 C. Although similar in content to the volume trailer 120 of FIG. 1A (discussed below for comparison purposes), data portion trailer 145 only contains data concerning the data portion 101 retained in the DASD when the volume 100 is transferred to the tape device. The data portion trailer 145 also differs from the volume trailer 120 in that in one embodiment it is stored in a quick access addressable storage device and not in the DASD or on the tape device.

The contents of an exemplary data portion trailer 145 are discussed below and is illustrated in FIG. 1C.

Trailer Header

Data portion trailer 145 may include a data portion trailer header 146, which contains various overhead information concerning the contents of the respective data portion trailer. A similar header 122 is used in volume trailer 120, shown in FIG. 1A. For example, the header 146 may list the name of the data portion 101, a count of records in the data portion trailer, an error code such as a LRC, CRC, or checksum, and a unique code identifying the header 146 as a data portion trailer header.

Fields

The data portion trailer 145 may also include a set of fields for the data portion preceding the data portion trailer. More particularly, trailer 145 may also include a pointer field, count field, marker code field, and equi-length record field.

In the illustrated example of FIG. 1C, fields are shown for a representative data portion "P". The pointer field 147 contains a pointer corresponding to the beginning of the data portion P. As an example, the pointer may list the address of the first header in the data portion corresponding to that pointer.

Similarly, the volume trailer 120 may also include an assembly of fields for the volume 100. The trailer 120 includes a pointer field, group count field, marker code field, and equi-length record field. In the example of FIG. 1A, fields are shown for a representative record group numbered "N".

The trailers 120 and 145 may each include a corresponding count field 126 and 148, respectively. The fields 126 and 148 list the number of data records in the corresponding record group N or data portion 101. For the record group 116 shown in FIG. 1A, for example, a group count field (not shown) of trailer 120 would count two records. For data portion 101, a count field of trailer 145 shown in FIG. 1B would count P records.

The marker code field contains a count of the number of marker codes in the data portion 101. For marker code field 149 of the data portion trailer 145, the count would be "one." Volume trailer 120 also uses a marker code field 128 employed similarly to the marker code field 149.

As stated above, data portion trailer 145 may also include an equi-length (or "equi-size") record field, such as the equi-length record field 150, for the data portion 101. The field 150 indicates, for the data portion 101, whether the data records in that group are equi-sized. Preferably, the field 150 comprises a binary bit storing one predetermined value (e.g., binary "one") if the data portion 101 contains identically sized data records, and a different predetermined value (e.g., binary zero) if the data portion 101 contains data records of varying sizes. If the data portion 101 contains marker codes, it is ineligible for equi-length record status, because marker codes as illustrated constitute record headers with no associated data record. The Volume trailer 120 of FIG. 1A also incorporates a equi-length data field 130 which is similarly utilized.

Volume Tail

The data portion trailer 145 may conclude with a data portion trailer tail 153. The tail 153 shown in FIG. 1C may include a byte count 151 indicating the number of bytes in the data portion trailer 145, and a unique code 152 identifying the data portion trailer 145 as such. The volume trailer 120 may include a similar tail 132 having a byte count 134 and a unique code 135.

Data Storage Subsystem

As mentioned above, the data storage format of the invention may be implemented in a number of different storage environments. In the preferred embodiment, however, DASD storage is used. Accordingly, one aspect of the invention concerns a data storage subsystem, configured to store and quickly access data employing the unique storage format and fast access methods of the invention.

Figure 2:
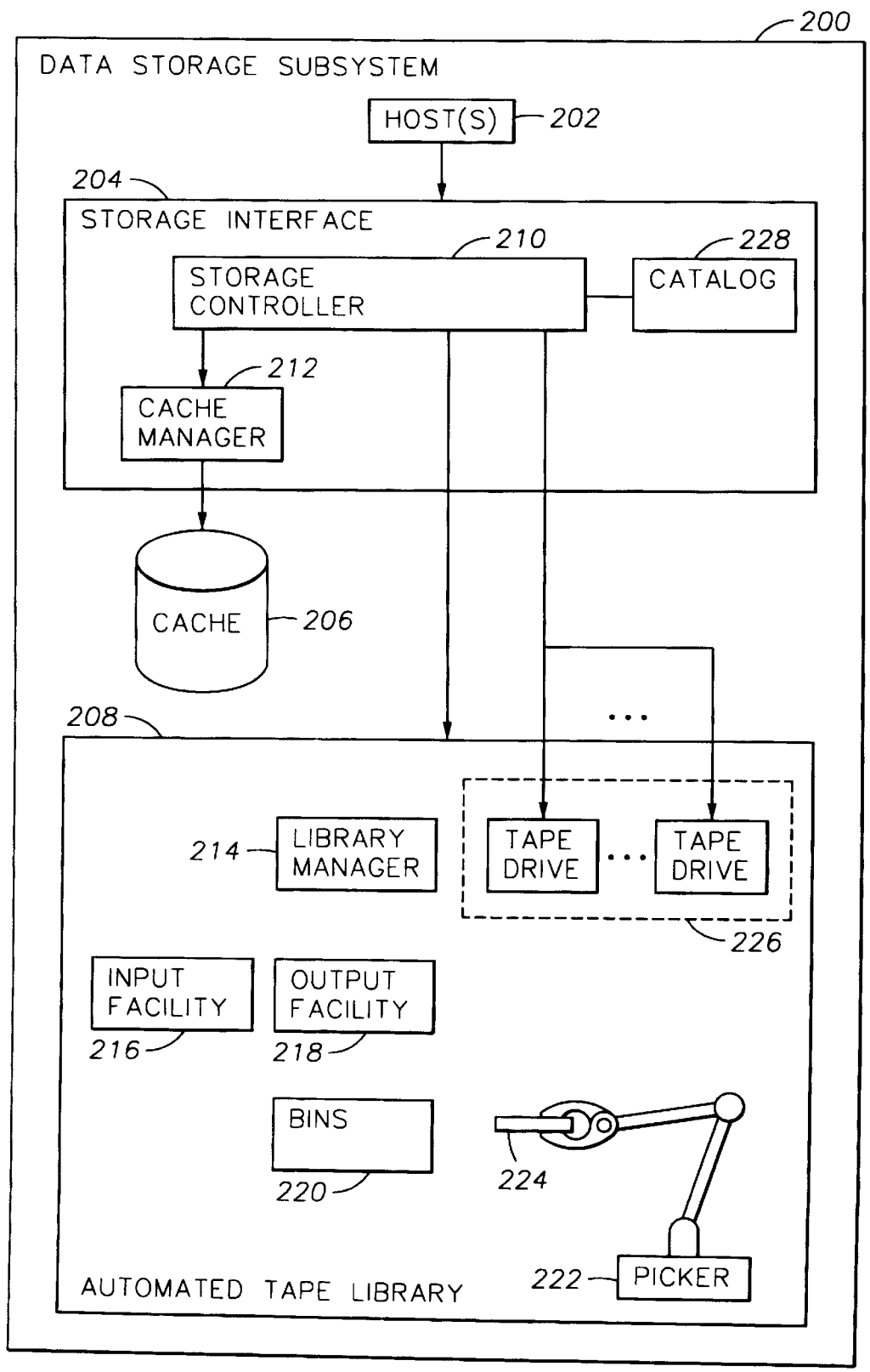
FIG. 2 is a block diagram of a data storage subsystem according to the invention.

FIG. 2 depicts various hardware components and interconnections of one exemplary data storage subsystem 200 of the invention. The subsystem 200 includes one or more hosts 202, a storage interface 204, and an automated tape library 208. Optionally, for reasons explained below, the subsystem 200 may also include a cache 206. Broadly, the hosts 202 comprise one or more units that utilize data stored on the cache 206 and library 208. In an exemplary implementation, the hosts 202 include an addressable storage device and may be embodied by a variety of types and numbers of units, such as: mainframe or personal computers; workstations; user consoles, keyboards, or terminals; or application programs. The storage interface 204 exchanges data between the hosts 202 and the cache 206, and between the hosts 202 and the library 208. These exchanges are conducted in accordance with commands from the host 202. As an example, the storage interface 204 may be implemented by executing appropriate software programming with a processing unit such as a IBM model RS6000 RISC microprocessor. The storage interface 204 and cache 206 may be embodied, for example, in an IBM model 3494 model B16 virtual tape server.

The automated tape library 208 comprises an apparatus that manages the storage, loading, unloading, movement, writing, and reading of portable sequential storage media, such as tapes 224. The tapes 224 are stored in bins 220. A picker 222, such as robotic arm, selectively directs tapes 224 from an input facility 216, to an output facility 218, and to/from tape drives 226. The input facility 216, for example, may include a batch loading mechanism (not shown) for receiving tapes from an operator, along with one or more tape storage slots. Similarly, the output facility 218 may include a batch output mechanism (not shown) for transferring tapes from the library 208 to an operator, along with one or more tape storage slots.

The tape library 208 may comprise a new design, or a conventional tape library. As an example, the tape library 208 may comprise an IBM 3494 tape library with at least (1) an IBM 3490 model C2A tape drive to access the following types of tapes: the IBM CST tape (standard cartridge system tape, 18 or 36 track format), and the IBM ECCST tape (enhanced capacity cartridge system tape, 36 track format), and (2) an IBM 3590 model B2A tape drive to access the IBM HPCT tape (high performance cartridge tape, 128 track format). The library 208 also includes a tape library manager 214, which oversees operations of the library 208, and may comprise a new design or a conventional manager for the specific configuration embodied by the library 208. In the illustrated example, the tape library manager 214 may comprise a the library manager used in the IBM 3494 tape library.

The cache 206, an optional component, may be included in the subsystem 200 to provide a fast-access data storage location. As discussed in greater detail below, newly received data may be first stored in the cache 206, and then immediately migrated to the tape library 208, or migrated to the tape library 208 upon satisfaction of some criteria, such as a period or level of non-use. In an illustrative embodiment, the cache 206 may comprise a magnetic disk storage device such as a high data capacity "hard drive."

The storage interface 204 includes a storage controller 210, a cache manager 212, and a catalog 228. The cache manager 212 oversees operations of the cache 206, and may comprise a new design or a conventional manager for the type of data storage device embodied by the cache 206. In the illustrated example, the cache manager 212 may comprise a disk drive controller. The catalog 228 is used by the storage controller 210 to maintain information about the location of the data stored within the data storage subsystem 200.

The storage controller 210 directs operations of the managers 212/114 and also moves data to/from the tape drives 226. The storage controller 210 receives commands and data from the hosts 202, and issues appropriate commands to direct the managers 212/114 to take the necessary actions to execute the hosts' commands. The storage controller 210 may comprise a digital processing apparatus including an addressable storage unit. For example, the apparatus may comprise a microprocessor, personal computer, or more advanced processing machine.

Additional information about tape emulation systems is provided by the following references: (1) U.S. Pat. No. 4,467,421, entitled "Virtual Storage System & Methods", issued Aug. 21, 1984; (2) U.S. Pat. No. 5,805,864, entitled "Virtual Integrated Cartridge Loader for Virtual Tape Storage System", issued Sep. 8, 1998; (3) U.S. Pat. No. 5,809,511, entitled "Outboard Data Migration in a Volume Stacking Library", issued Sep. 15, 1998; and (4) U.S. Pat. No. 6,098,148, entitled "Storage and Access of Data Using Volume Trailer", issued Aug. 1, 2000 in the name of W. C. Carlson, one of the inventors of the current application. The contents of the foregoing references are incorporated by reference.

Digital Data Processing System

The data storage formats of the invention may be implemented in a number of different ways, depending upon the specific needs of the application. As one example, the formats may be applied by the cache manager 206 when storing data to DASD. Alternatively, the formats may be implemented on a higher level, such as by the storage controller 210 or host 202.

Wherever implemented, in the subsystem 200 or elsewhere, the data storage formats of the invention are preferably applied by an electronic formatting unit (not shown) that may be provided by discrete circuitry, application-specific integrated circuitry, programmable circuit components, logic circuitry, or a combination. As another alternative, some of the features of this module may be implemented in software, while others are implemented using suitable hardware.

Figure 3:
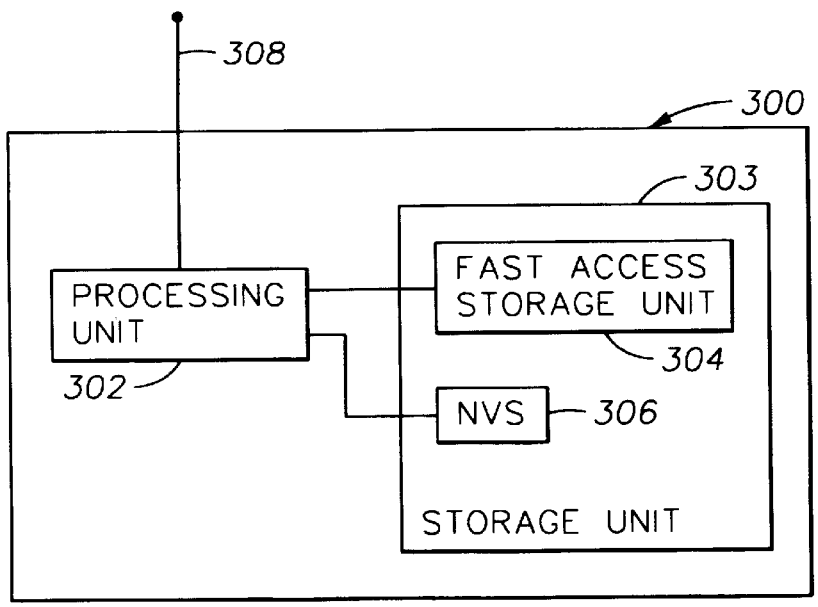
FIG. 3 is a block diagram of a digital data processing system according to the invention.

In the preferred embodiment, however, the formatting unit is implemented in software, by using a digital computer to execute a sequence of programming instructions. In this embodiment, then, the components of the formatting unit comprise software modules or functional units, rather than actual hardware components. This embodiment is therefore implemented using a digital computer 300, as shown in FIG. 3.

The computer 300 includes a processing unit 302, such as a microprocessor or other processing machine, coupled to a storage unit 303. The storage unit 303 may, for example, include an addressable storage unit 304 and a nonvolatile storage unit 306. The addressable storage unit 304 preferably comprises a fast access storage device such as random access memory, and may be used to store the programming instructions executed by the processing unit 302 during such execution, and in the preferred embodiment, the data contained within the data portion trailer 145. Alternatively, the data portion trailer data may be contained within the nonvolatile storage unit 306. The nonvolatile storage unit 306 may comprise, for example, one or more magnetic data storage disks such as a "hard drive", a tape drive, or any other suitable storage device required by the invention. The computer 300 also includes an input/output 308, such as a line or bus for exchanging data with the processing unit 302.

Despite the specific foregoing description, ordinarily skilled artisans having the benefit of this disclosure will recognize that the computer 300 may be implemented in a computer of different construction, without departing from the scope of the invention. As a specific example, one of the storage units 304/306 may be eliminated, or both units 304/306 may be eliminated with the processing unit 302 including on-board storage instead. Furthermore, some or all of the components 302/304/306 may be shared by other hardware devices, in the data storage subsystem 200 or elsewhere.

OPERATION

In addition to the various hardware embodiments described above, a different aspect of the invention concerns various methods for storing, sequencing through, and locating stored data referenced by a data portion trailer.

Signal-Bearing Media

In the specific example of FIG. 2, these methods of the invention (described in detail below) may be implemented by operating the cache manager 212, storage controller 210, or another suitable electronic module to execute a corresponding sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to store or access data.

Figure 4:
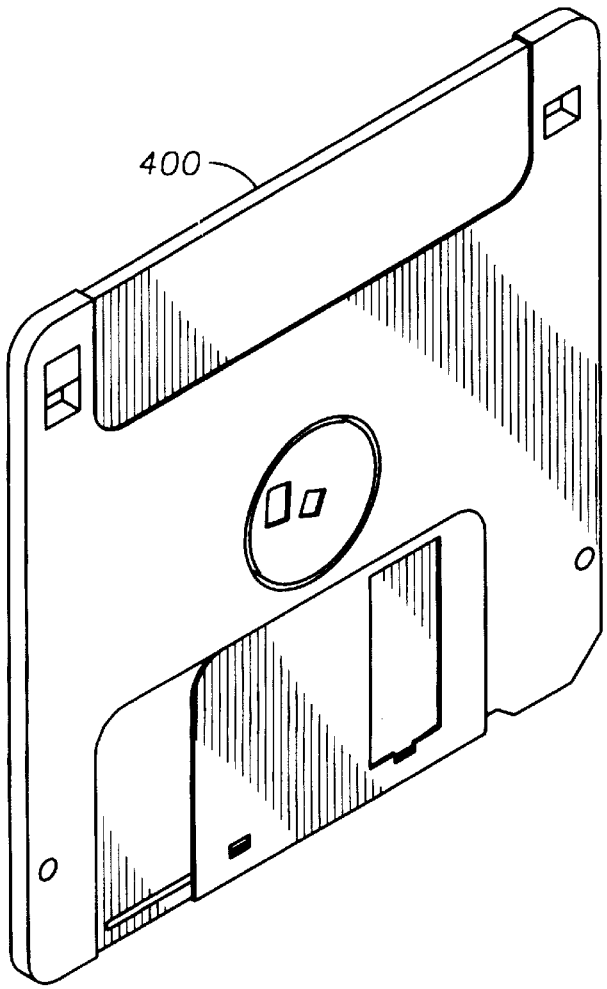
FIG. 4 is a perspective view of a programmed product in accordance with the invention.

This signal-bearing media may comprise, for example, RAM contained within the storage unit 303 of the computer 300. Alternatively, the instructions may be contained in another signal-bearing media, such as a magnetic data storage diskette 400 (FIG. 4). Whether contained in the storage unit 303, diskette 400, cache manager 212, storage controller 210, or elsewhere, the instructions may instead be stored on another type of data storage medium such as DASD storage (e.g., a conventional "hard drive" or a RAID array), magnetic tape, electronic read-only memory (e.g., CD-ROM or WORM), an optical storage device (e.g., WORM), paper "punch" cards, or other suitable signal-bearing media including transmission media such as digital and analog and communication links and wireless. In an illustrative embodiment of the invention, the machine-readable instructions may comprise lines of compiled C language code.

Method Sequences

Figure 5:
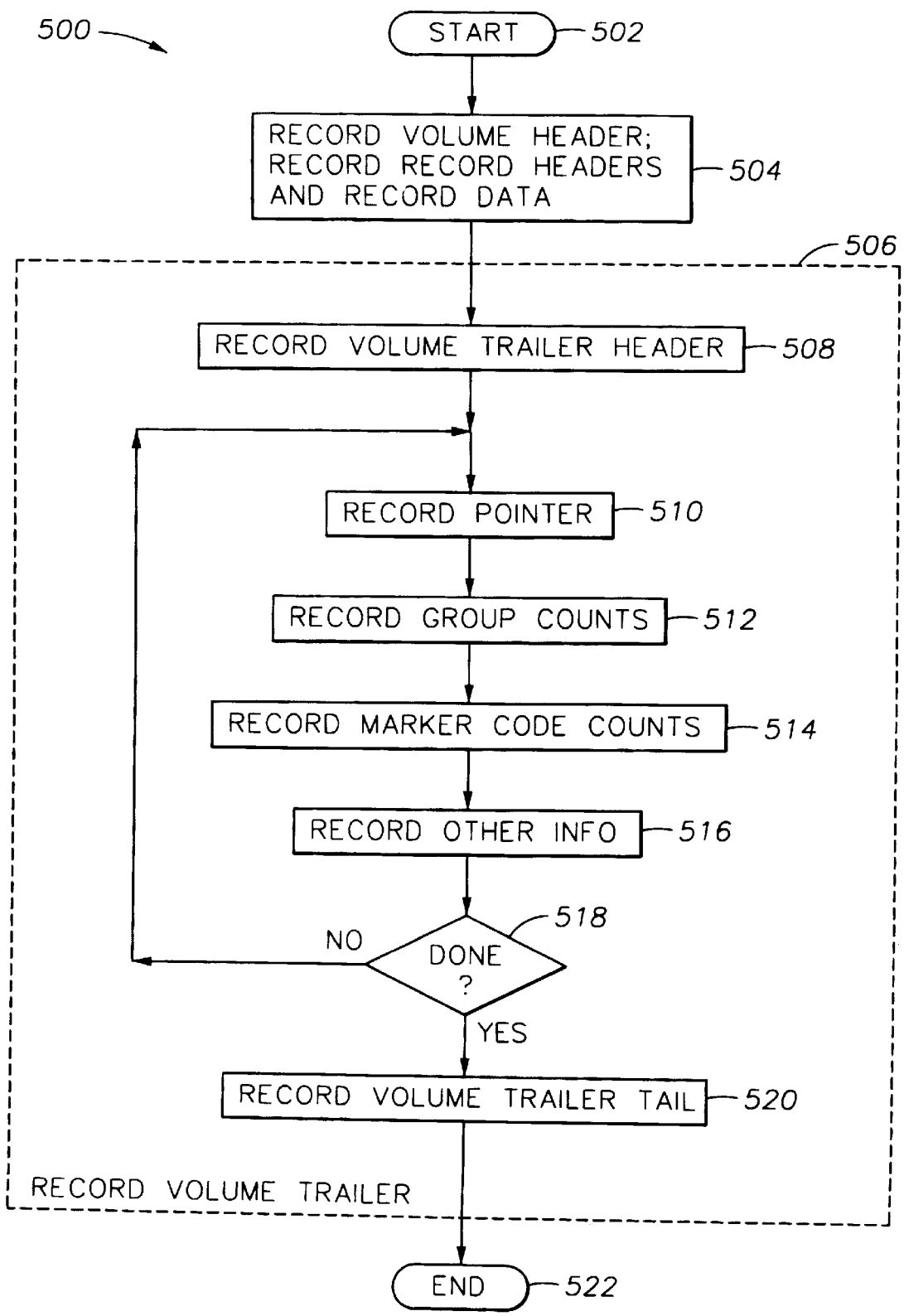
FIG. 5 is a flowchart illustrating a routine for storing data in a preferred format according to the invention.

One method of the invention concerns the retention and storage in a DASD of a portion of a data volume transferred to a tape device, as specifically illustrated by the sequence 500 of FIG. 5. For ease of explanation, but without any limitation intended thereby, the example of FIG. 5 is described in the context of the data storage subsystem 200, the volume 100, and the data portion 101 described above. In this example, the steps 500 are initiated in step 502, when the cache manager 212 commences storage of a volume 100 of data in the DASD cache 206.

Following step 502, the cache manager 212 writes digital data including the volume header 102 and then each record header and corresponding data record to the tape library 208. In addition to write operations step 504 may also include various tape access operations, such as reads, locates, etc. After step 504, the cache manager 212 records the volume trailer 120 in step 506. Step 506 may be performed at various times, such as issuance of an unload request, change from read to write mode, etc. Step 506 includes storage of the volume trailer header 122 (step 508), and for each record group, a pointer field 124 (step 510), a group count field 126 (step 512), a marker code field 128 (step 514), and other information such as the equi-length record field 130 (step 516). Although not shown, the cache manager 212 preferably computes the values stored in the fields 124, 126, 128, 130, and 132. One performance of steps 510–516 thus writes the fields 124–130 to the tape library 208 for a particular record group. Step 518 then determines whether all record groups have been presented in the volume trailer 120. If not, steps 510–516 are repeated. Otherwise, step 520 proceeds to write the tail 132 to the tape library 208 after all data records and record headers have been written to the volume trailer 120.

When the cache manager 212 writes the digital data to the tape library 208 in step 504, the cache manager 212 also retains a portion of the digital data in the DASD. In one embodiment, the portion of digital data includes record headers and record data. In the preferred embodiment, the portion of digital data retained may include a volume header. As long as the digital data does not include a large amount of metadata—data identifying data—at the beginning of the portion retained, the host 202 volume label data is contained in the portion of data retained in the DASD. In the preferred embodiment, volume label data is included in the portion of data retained on the DASD when the volume 100 is transferred to the tape device. The volume label data may comprise, for example, volume identification information, data and time stamp information.

The portion of data retained on the DASD allows the host 202 to quickly access data which otherwise would only be accessible by mounting a tape containing the data requested, and recalling a data device volume from the tape library 208. And, by constructing and using a data portion trailer as discussed below, even faster access to the data retained in DASD can be achieved.

After step 520, the routine 500 ends in step 522.

Write

In the illustrated embodiment, the reading and writing of record headers and data records is performed with a physical component of the cache 206, such as a read/write head (not shown). Alternatively, instead of a physical device such as a read/write head, a software pointer (not shown) may be advanced to a desired address to read or write data from/to that address. This embodiment is especially applicable where the cache 206 includes randomly accessible integrated circuit memory, such as RAM.

A write operation involves building the appropriate record header, then writing the record header followed by the data record. Multiple write operations involve separately writing record headers and data records, resulting in a series of multiple logically concatenated record headers and data records.

When a write operation is performed by the host 202, all restrictions which may have been engaged to allow fast read access to the portion of data retained in the DASD are removed. Because of the nature of emulated sequential-access media discussed above, a new end of data point is defined on completion of the write. The write operation places the entire volume of "new" or revised data to be written to the sequential-access storage media resident in the VTS. If the write operation modifies the data contained in a volume currently stored in the sequential-access media, the "old" volume data resident on the sequential-access media prior to the write operation is no longer current nor required. Once the host 202 closes the write operation, the "new" volume may be transferred from the VTS to the tape backup.

A data portion trailer 145 is updated as the host 202 performs read or space forward operations. Once a write operation is completed, the data is no longer a data portion, and the data portion trailer becomes the data trailer. This data trailer is written at various synchronization points, known to those in the art as "sync points".

Some exemplary sync points include changing from write mode to read mode (or vice versa) or an explicit sync command from a host 202.

Read

When the host 202 requests to read data, the host 202 may request that the volume 100 be recalled from the tape device. Alternatively, the host 202 may request that the fast access capabilities of the current invention be used, thereby avoiding recall from the tape device. Instead, access to the data portion 101 stored on the DASD is permitted with some limitations.

A read operation involves reading a record header, verifying it, extracting the data length from the header, then reading the corresponding record data of the specified length. Depending upon the physical implementation of the cache 206, the read/write device (or software pointer) is then positioned to read the next record header. With marker codes, which have no associated data record, no data record is read. After reading the marker code, the read/write device (or software pointer) is then positioned to read the next record header. During the read process, data portion trailer information is gathered and a data portion trailer is constructed.

In the fast access mode of the present invention, such read operations can be performed as long as the required data is contained entirely within the data portion 101 stored in the DASD. After this point, any further read requests are rejected, and the position of the read/write device (or pointer) remains unchanged. In one embodiment, an error signal may be returned to the host 202 if a read request is made which violates this protocol.

Rewind

A rewind operation simply changes the position of the read/write device (or pointer) to the BOT position shown in FIG. 1B.

Forward Space Block

These operations simply move the read/write device (or pointer) to the next record header in the data sequence (forward space block), or the previous record header in the data sequence (backward space block).

The forward space block operation is performed by reading the current record header to obtain the length of its associated data record. This information is used to compute the position of the next record header, to which the read/write device (or pointer) is then advanced. The information is also used to build the data portion trailer 145. In the fast access mode of the present invention, the forward space operation will fail if the end of the portion of data 101 stored in the DASD is reached. Any further forward space block operation requests are rejected, and the position of the read/write device (or pointer) remains unchanged. In one embodiment, an error signal may be returned to the host 202 if a read request is made which violates this protocol.

Accessing Data Portion Trailer

The data portion trailer 145 is normally constructed from data gathered when read and forward space block operations are executed. The data portion trailer 145 may be accessed to facilitate backward space block requests and backward space file requests. The data portion trailer 145 is preferably stored in an addressable storage unit. If the data portion trailer 145 is not found or is invalid for some reason, backward space block and backward space file requests cannot be performed. However, the necessary data portion trailer 145 information may be rebuilt by scanning through the data portion 101, as discussed above.

Backward Space Block

A backward space block is performed by consulting the data portion trailer 145 to identify the beginning address of the current data portion, and then progressing with forward space blocks to the record header prior to the current record header. Alternatively, with equi-sized data records, a backward space block may be performed by starting from a record header and jumping backwards an even distance equal to the starting record's length plus the standard record header's length.

Backward Space File

Figure 6A:
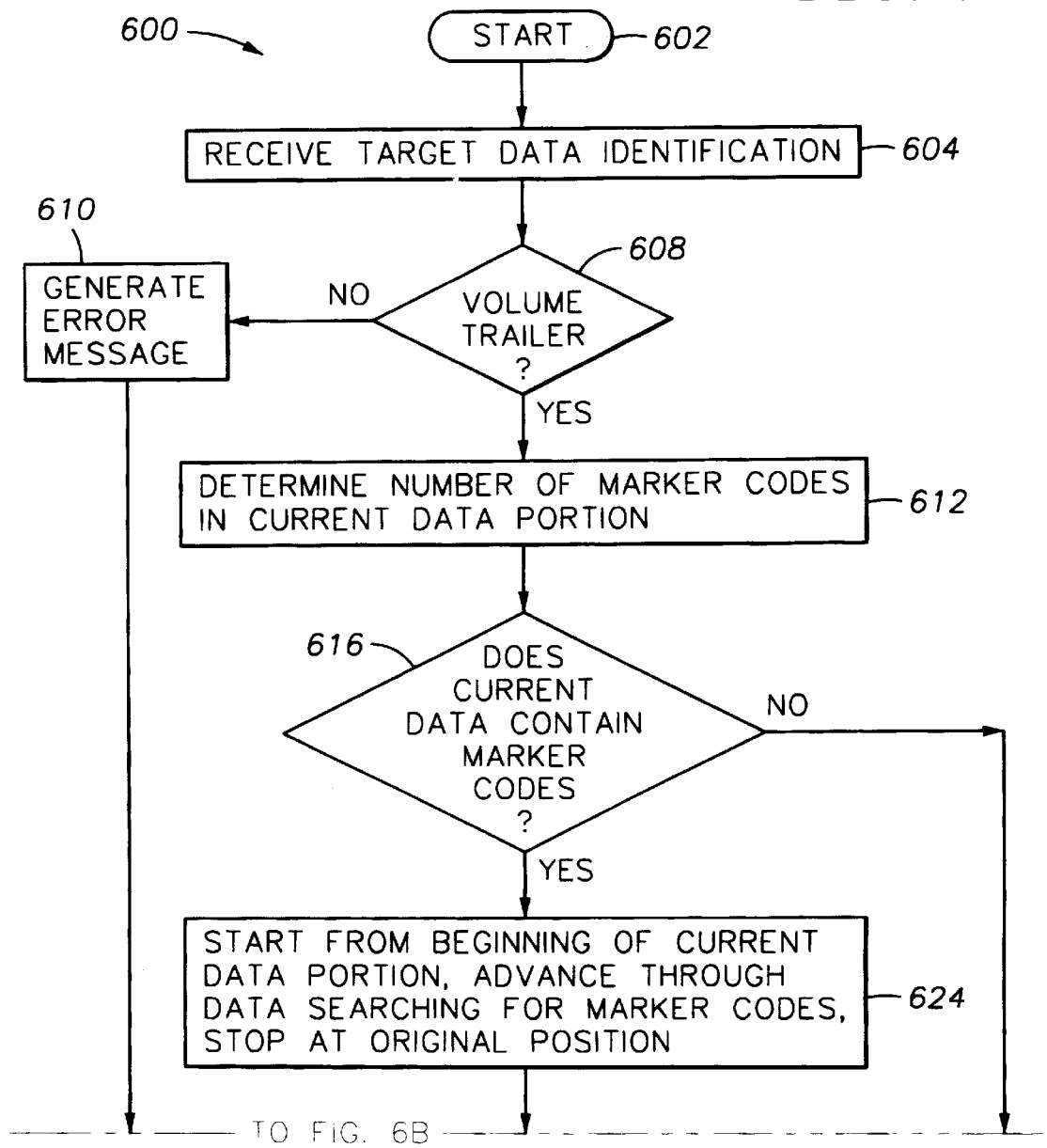
FIGS. 6A–B depict a backward space file routine represented as a diagram flow according to one embodiment of the present invention.

Another method of the invention concerns locating target data stored in the data portion 101 formatted according to the invention by the reversing from an original address to an earlier address containing the next previous marker code to the original address. This emulates a tape operation commonly called a "backward space file." A specific example of this method is illustrated by the sequence 600 of FIG. 6. For ease of explanation, but without any limitation intended thereby, the example of FIG. 6 is described in the context of the data storage subsystem 200 and volume 101 described above.

In the illustrated example, the steps 600 are initiated in step 602, when the storage controller 210 initiates a backward space file operation to reposition a read/write head (not shown) from an original address in the cache 206 to the next-previous marker code in the data sequence. Alternatively, instead of a physical device such as a read/write head, the routine 600 may serve to advance a software pointer from an original address to the next marker code. This embodiment is especially applicable where the cache 206 includes randomly accessible integrated circuit memory, such as RAM. The "original" or "current" address is the address at which the read/write head (or pointer) is positioned upon commencement of the routine 600.

After step 602, target data identification information is received from the host 202 in step 604. The data portion trailer 145, which was constructed when previous read and forward space operations were performed, is used in step 608 to locate the target data. If no data portion trailer 145 has been built, an error message is generated in step 610.

After step 608, step 612 determines the number of tape marks in the data portion 101. There may be zero, one, or multiple marker codes in the data portion 101. Step 612 is accomplished by consulting the marker code field 128 corresponding to the data portion 101.

Figure 6B:
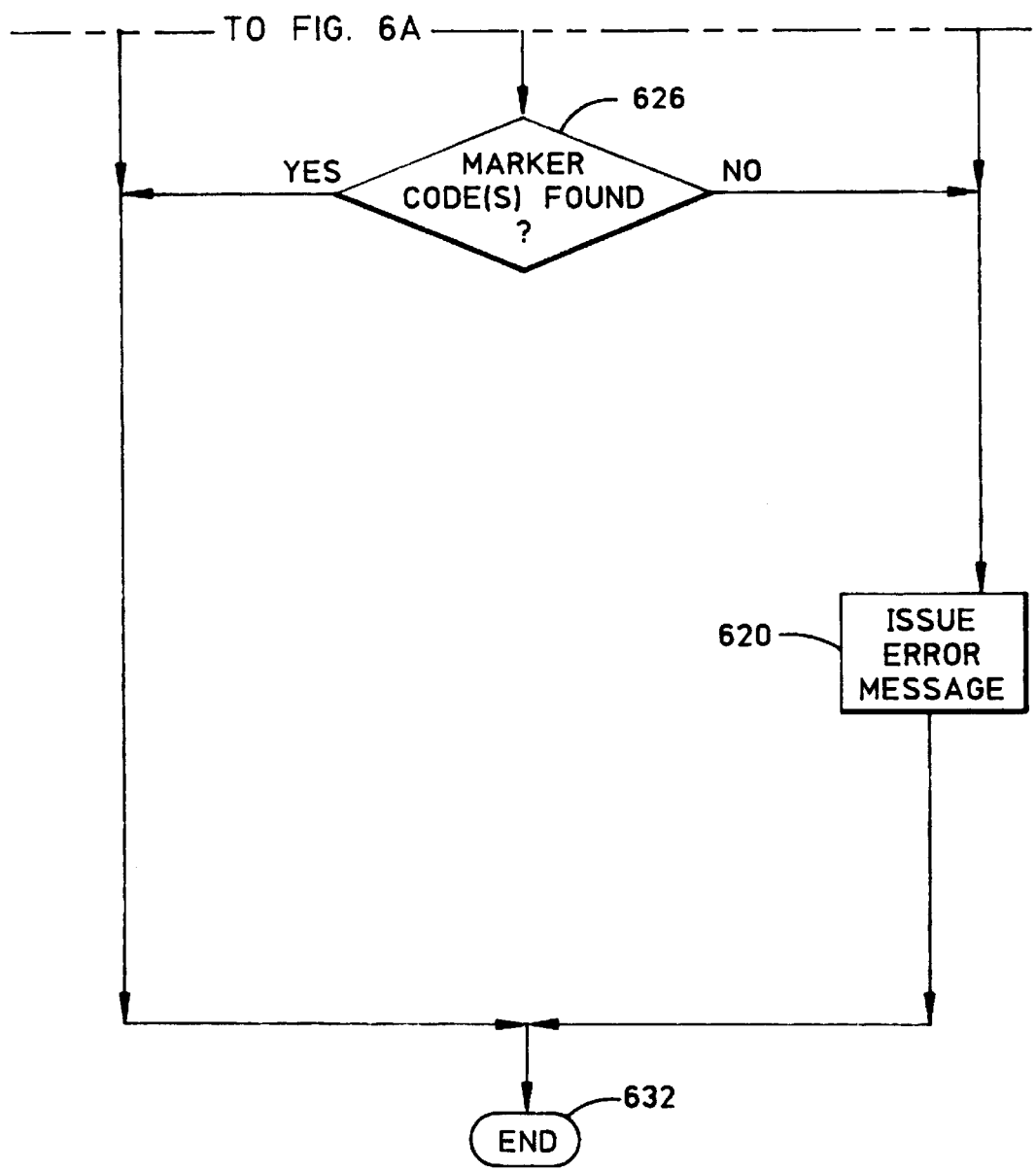

Next, if the current address being read lacks one or more marker codes, step 616 branches to step 620, shown in FIG. 6B, and an error message issues, with the routine 600 ending in step 632.

In contrast to the foregoing description, steps 624–626 are performed if step 616 determines that the data portion 101 does contain a marker code. Step 624 advances the read/write device (or pointer) from the beginning of the original record, searching for the last marker code prior to the original address. More specifically, step 624 first consults the data portion trailer's 145 pointer field 147 to identify the beginning address for the original record; then, starting at the beginning address, step 624 sequentially reads each record header starting at the beginning address until reaching the last marker code in the data portion 101 prior to the original address. If a marker code is found, step 626, shown in FIG. 6(B), directs control to step 632, where the routine 600 ends. At this point, having found the marker code by advancing thereto, the read/write device (or pointer) is positioned at the located marker code. If no marker code is found, however, step 626 directs control to step 620, and an error message issues as discussed above.

By contrast, forward space file operations are not permitted and are failed with an error code specific to the event failure. Similarly, routines commonly known as forward locates—where target data is located by moving forward directly to a specified record number—are not allowed. If such a request is made, an error message specific to the event failure is generated.

Backward Locate

Figure 7:
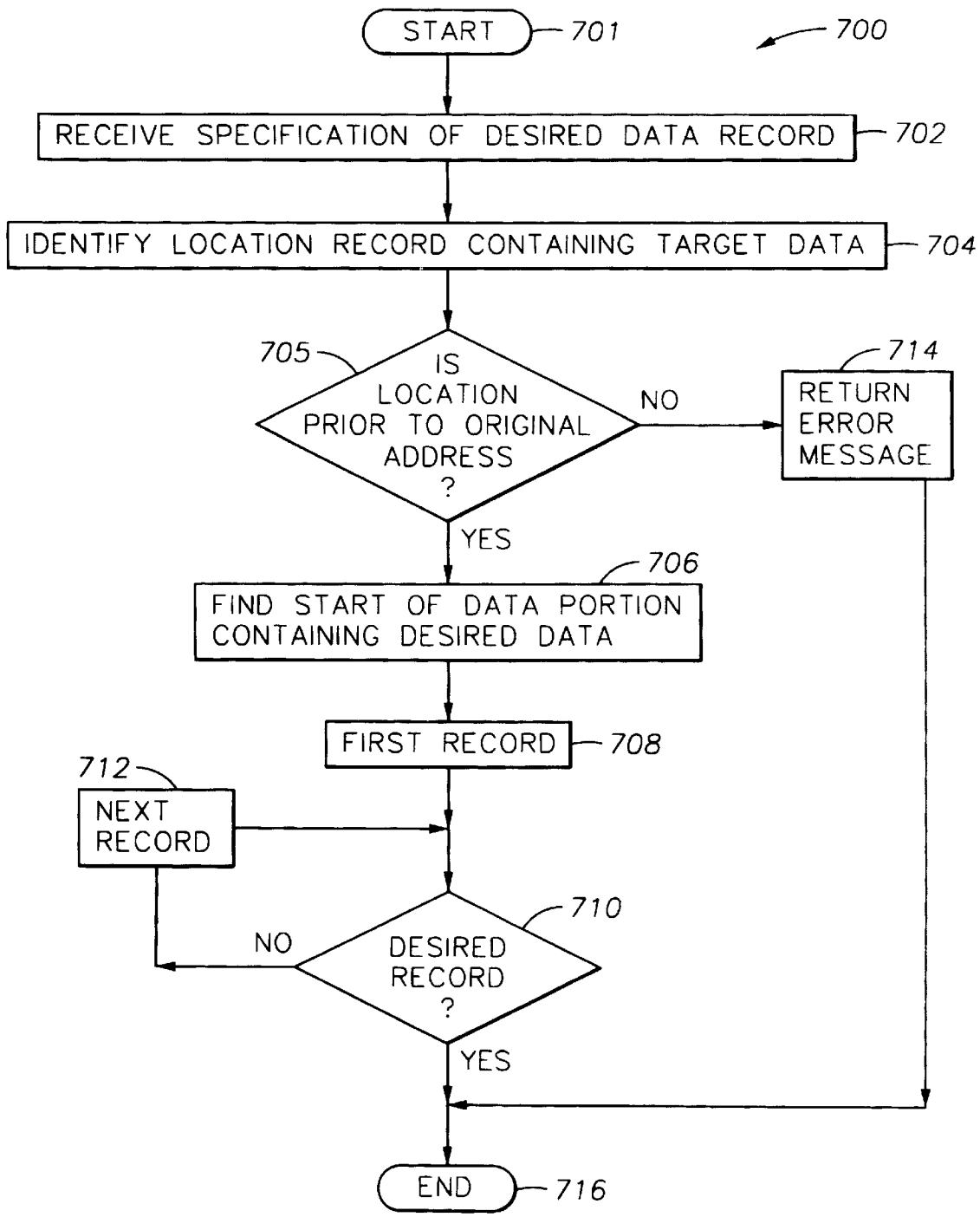
FIG. 7 shows a flow diagram representing a backward locate routine according to one version of the present invention.

Another method of the invention concerns locating a desired data record stored in a data portion 101 formatted according to the invention by moving from an original address directly to an earlier address. An example of this method is illustrated by the sequence 700 of FIG. 7. For ease of explanation, but without any limitation intended thereby, the example of FIG. 7 is described in the context of the data storage subsystem 200 and the data portion 101 described above. In this example, the steps 700 are initiated in step 701, when the storage controller 210 initiates a backward locate operation to find a desired data record in a data portion 101 stored in the DASD cache 206.

Following step 701, the storage controller 210 in step 702 receives an identification of a desired ("target") data record to locate. In this example, the target data record is identified by its record header number. Next, the storage controller 210 in step 704 references the count fields 148 of the data portion trailer 145 to identify the location of the beginning of the data portion containing the target data. If the location of the record is prior to an original address in step 705, the backward locate operation continues. Otherwise, an error message is generated in step 714 and the method ends in step 716.

Next, the storage controller 212 references the pointer field 147 of the data portion trailer 145 to identify the address where the record containing the desired data begins. As an example, step 706 may also involve movement of a read/write head (or pointer) to the record's beginning address. Following step 706, the storage controller 212 commands the cache 206 to read the record header at the beginning address in step 708. Step 710 then determines whether the first record header corresponds to the target data record. If so, the desired data record has been found, and the routine 700 ends in step 716. Otherwise, step 710 branches to step 712, in which the storage controller 212 commands the cache 206 to read the next-ordered prior record header in the data portion 101. Steps 710/712 repeatedly advance through successive prior record headers until the record header corresponding to the desired data record is found. After step 710 answers in the affirmative, the routine 700 ends in step 716. Proceeding to the next prior record header is achieved by performing a backward space block or backward space file. Alternatively, if the target record's equi-length record field 150 reveals that records of the data portion 101 are equi-sized, steps 710–712 may be abbreviated by computing the beginning address of the target data record and moving directly to the record. This address is easily computed with knowledge of the common size of all data records (from step 708) and the standard size of all record headers.

Other Embodiments

While there have been shown what are presently considered to be preferred embodiments of the invention, it will be apparent to those skilled in the art that various changes and modifications can be made herein without departing from the scope of the invention as defined by the appended claims.

What is claimed is:

1. A computer implemented method of reversing from a first data record address to a target data record address of machine-readable data stored on a direct access storage device (DASD), said DASD containing a data portion of a logically ordered sequence of digital data stored on a backup sequential storage medium, the data portion of the logically ordered sequence including:

at least one data record;

a record header preceding each data record, each record header having a beginning address in the direct access storage device;

said method of reversing comprising:

receiving identification of a target data record having the target data record address and including a record header indicating a position of the target data record in the logical ordering;

consulting a data portion trailer to determine the number of marker codes in the data portion; and if the data portion contains marker codes, consulting the data portion trailer to determine a beginning address of said at least one data, and starting at the beginning address, sequentially advancing through each data record of said at least one data record until reaching a first one of the following: a last marker code prior to the target data record address, or the beginning address of the target data record, and if no marker code prior to the target data record is found, issuing an error message.

2. The method of claim 1, the data portion trailer comprising:

a pointer field containing the beginning address for each data record;

a count field containing a count of data records for the data portion; and a marker count field containing a count of marker codes for the data portion.

3. The method of claim 2, the data portion trailer further comprising an equi-length record field record.

4. A programmed product comprising signal-bearing media tangibly embodying a program of machine-readable instructions executable by a digital processing apparatus to perform operations of reversing from an original address to a target address of a machine-readable data record stored on a direct access storage device (DASD), said DASD containing a logically ordered sequence of digital data including:

at least one data record;

a record header preceding each data record, each record header having a beginning address in the direct access storage device;

said operations of reversing comprising:

receiving identification of a target data record including a record header indicating a position of the target data record in the logical ordering;

consulting a data portion trailer to determine the number of marker codes in the data portion; and if the data portion contains marker codes, consulting the data portion trailer to determine a beginning address of the said at least one data record, and starting at the beginning address, sequentially advancing through each data record of said at least one data record until reaching a first one of the following: a last marker code prior to the target address, or the beginning address of the target data record, and if no marker code prior to the target data record is found, issuing an error message.

5. The product of claim 4, said sequentially advancing comprising advancing a read head of the DASD through each remaining record until reaching a last marker code prior to the original address.

6. The product of claim 4, the sequentially advancing comprising advancing a software pointer through each remaining record until reaching a last marker code prior to the original address.

* * * * *

UNITED STATES PATENT AND TRADEMARK OFFICE
CERTIFICATE OF CORRECTION

PATENT NO.    : 6,256,706 B1
DATED         : July 3, 2001
INVENTOR(S)   : Carlson et al.

It is certified that error appears in the above-identified patent and that said Letters Patent is hereby corrected as shown below:

Column 6,
Line 5, change "equisized" to -- equi-sized --

Column 7,
Line 25, delete paragraph break and combine with previous paragraph.

Column 15,
Line 39, change "data," to -- data record, --

Column 16,
Line 29, delete "the"

Signed and Sealed this

Eighteenth Day of June, 2002

*Attest:*

JAMES E. ROGAN
*Attesting Officer*     *Director of the United States Patent and Trademark Office*